United States Patent [19]

Higuchi et al.

[11] Patent Number: 4,702,869
[45] Date of Patent: Oct. 27, 1987

[54] PROCESS FOR THE PRODUCTION OF CERAMICS

[75] Inventors: Matsuo Higuchi; Osamu Komura; Eiji Kamijo, all of Itami, Japan

[73] Assignee: Director General, Agency of Industrial Science and Technology, Tokyo, Japan

[21] Appl. No.: 920,908

[22] Filed: Oct. 17, 1986

Related U.S. Application Data

[63] Continuation of Ser. No. 677,676, Nov. 30, 1984, abandoned.

[30] Foreign Application Priority Data

Dec. 2, 1983 [JP] Japan ............................. 58-226778
Oct. 26, 1984 [JP] Japan ............................. 59-224092

[51] Int. Cl.$^4$ ............................................. C04B 33/32
[52] U.S. Cl. ........................................ 264/65; 264/66; 264/67
[58] Field of Search ........................... 264/66, 67, 65

[56] References Cited

U.S. PATENT DOCUMENTS 3,222,438 12/1965 Parr et al. ............................. 264/67
3,998,646 12/1976 Weaver ................................. 264/66
4,031,178 6/1977 Johnson et al. ...................... 264/67
4,209,478 6/1980 Wooten et al. ...................... 264/66
4,346,049 8/1982 Coppola et al. ..................... 264/66
4,354,990 10/1982 Martinengo et al. ................ 264/65
4,376,742 3/1983 Mah ..................................... 264/65

OTHER PUBLICATIONS

Petrovic et al., The Strength of Silicon Nitride after Exposure to Different Environments, in Ceramics for High-Performance Applications (1974) pp. 397–414.
Ritter et al., Application of Fracture Mechanics in Assuring Against Fatigue Failure of Ceramic Components, in Ceramics for High-Performance Applications III, 1983, pp. 503–533.

*Primary Examiner*—James Derrington
*Attorney, Agent, or Firm*—Wenderoth, Lind & Ponack

[57] ABSTRACT

Less dispersion and more homogenized ceramics are produced by sintering ceramic materials, in particular, containing silicon nitride or silicon carbide as a predominant component with other assistants or additives, machining the surface of the resulting sintered compact and then subjecting the sintered compact to a heat treatment for homogenizing in a non-oxidizing atmosphere such as nitrogen or argon gas at a temperature of from the mass-transfer temperature at which the mass-transfer takes place in the interior of the ceramics to blunt the fine point of a crack to the sintering temperature of the ceramics.

3 Claims, 1 Drawing Figure

PROCESS FOR THE PRODUCTION OF CERAMICS

This is a continuation of application Ser. No. 677,676, filed Nov. 30, 1984 and now abandoned.

BACKGROUND OF THE INVENTION

1. Field of the Invention

This invention relates to a process for the production of ceramics and more particularly, it is concerned with a process for obtaining a ceramic compact which is homogenized to give a decreased dispersion of strength with a high Weibull modulus.

2. Description of the Prior Art

Up to the present time, ceramic materials have been used as sintered or after machining the surfaces thereof in predetermined dimensions. Ceramics thus sintered, having roughened or bent surfaces, cannot be used for precision parts. Accordingly, in order to obtain a precision surface, a cutting or grinding step is carried out using a diamond tool. However, these machining methods have drawbacks in that a number of fine cracks or defects are formed on the surface of the ceramic sintered bodies or compacts, so that the properties thereof, and in particular the strength is and Weibull modulus of the ceramic bodies are lowered. The problem is more serious for materials having a lower fracture toughness.

For the purpose of solving the above described problems, it has been proposed to coat the machined surface with a ceramic material or to subject it to a heat treatment in an oxidation atmosphere, thus forming an oxidation film and eliminating the effect of surface cracks. However, in these methods, the adhesion between the substrate and the coating film or oxidation film is not sufficient and the effect of surface cracks is not eliminated.

For example, J. J. Petrovic and J. Jacobson have made studies on the relationship between the atmosphere and temperature during the heat treatment and the breaking strength by subjecting hot-press silicon nitride to grinding and then to a Knoop indentation of 2600 g, thus introducing fine cracks onto the surface of the silicon nitride, as described in "The Strength of Silicon Nitride After Exposure to Different Environments" in Ceramics for High-Performance Applications (1974), page 397–414. It is described therein that in the case of a sample with a large surface defect due to the Knoop indentation, the breaking strength is recovered by a heat treatment at a temperature of 1073° K. or higher in various oxygen partial pressures or nitrogen atmosphere while in the case of a sample undergoing only a grinding step, the strength is somewhat lowered by similar heat treatments. As is evident from this citation, it is very difficult to eliminate the effects of the fine machining cracks formed during grinding, apart from the large surface defects.

J. E. Ritter jr. et al. have reported efforts to eliminate the effect of cracks or fractures formed on the surface of hot-press silicon nitride as a result of grinding the surface thereof by utilizing surface oxidation in "Application of Fracture mechanics in Assuring Against Fatigue Failure of Ceramic Components" in Ceramics for High-Performance Applications—III: Reliability (1983), page 503–533, which it is described that the fine points of the cracks are blunted by oxidation, but that simultaneously, pits are formed as a result of oxidation, so that the strength is determined depending on the extent of oxidation. Since the oxidation resistance of silicon nitride varies to a great extent with the variety of oxides added as an assistant during sintering and since there are silicon nitride ceramics of such a type as being readily oxidized to markedly lower the strength thereof, the above described efforts to eliminate the effect of machining cracks by controlling the oxidation is not always suitable.

SUMMARY OF THE INVENTION

It is an object of the present invention to provide a process for the production of ceramics, whereby the above described disadvantages of the prior art can be overcome.

It is another object of the present invention to provide a process for obtaining ceramics or ceramic compacts excellent in homogeneity.

These objects can be attained by a process for the production of ceramics, which comprises sintering ceramic materials, machining the surface of the resulting sintered compact and then subjecting the compact to a heat treatment in a non-oxidizing atmosphere at a temperature of from the mass-transfer temperature to the sintering temperature.

BRIEF DESCRIPTION OF THE DRAWING

The accompanying drawing is to illustrate the principle and merits of the present invention in greater detail:

DETAILED DESCRIPTION OF THE INVENTION

Figure 1:
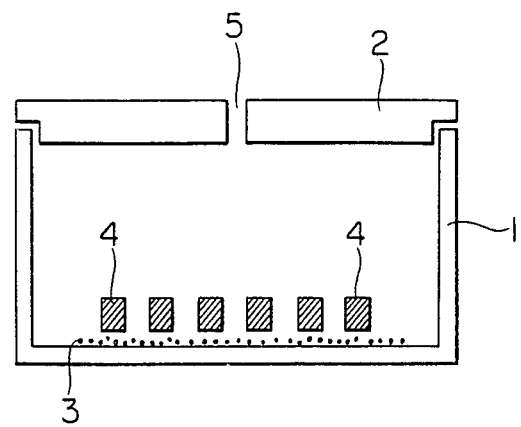
FIG. 1 is a cross-sectional view of one embodiment of a carbon case suitable for use in the practice of the process of the present invention.

The inventors have made various studies to solve the above described problems and consequently, have found a process for producing ceramics excellent in homogeneity. That is, the present invention provides a process for the production of ceramics, which process comprises sintering ceramic materials, in particular, containing silicon nitride or silicon carbide as a predominant component with other aids or additives, machining the surface of the resulting sintered compact and then subjecting the compact to a heat treatment for homogenizing it in a non-oxidizing atmosphere such as nitrogen or argon gas at a temperature of from the mass-transfer temperature at which the mass-transfer takes place in the interior of the ceramics to blunt the fine points of cracks to the sintering temperature. The mass-transfer temperature is generally at least 1200° C. in the case of ceramics of silicon nitride type and at least 1400° C. in the case of ceramics of silicon carbide type.

The ceramics of the present invention include ceramics of the silicon nitride type or the silicon carbide type. The ceramics of the silicon nitride type are those prepared by mixing silicon nitride powder as a predominant component with several to several ten percent of sintering aids or additives and then subjecting the mixture to normal pressure sintering, to hot press sintering or to reaction sintering. As the sintering aid, there can be used at least one member selected from the group consisting of oxides or nitrides of Group IIA, IIIA, IIIB and IVB elements of the Periodic Table and mixtures thereof, for example, MgO, $Al_2O_3$, $Y_2O_3$, $CeO_2$, AlN, TiN and the like. As the additives, there can be used at least one member selected from the group consisting of carbides of Group IVB elements, for example, TiC. These mixtures are sintered at normal pressure or by a hot press to prepare ceramics of the silicon nitride type. Moreover, ceramics of the silicon nitride type can be obtained by subjecting mixtures of silicon nitride and silicon to reaction sintering in a nitrogen atmosphere.

The ceramics of silicon carbide type are those prepared by mixing silicon carbide powder as a predominant component with several to several ten percent of sintering aids or additives and then subjecting the mixture to normal pressure sintering, to hot press sintering or to reaction sintering. As the sintering aid, there can be used at least one member selected from the group consisting of Group IIIA and IVA elements of the Periodic Table, for example, B, Al, C, Si and the like, and oxides, carbides and nitrides of Group IIIA elements of Periodic Table, for example, $Al_2O_3$, $B_4C$ and AlN and the like. These mixtures are sintered at normal pressure or by hot press or reaction sintering to prepare ceramics of the silicon carbide type.

The present invention can favourably be applied to any of these ceramics with the advantage of obtaining ceramics of high homogeneity.

The machining of the ceramics is generally carried out by cutting or grinding such as by using diamond wheels, or by using a discharge, an electron beam or a laser beam. The present invention is equally effective for any machining methods which result in mechanical or thermal cracks, scratches or defects to the surfaces of the ceramics. Examples of the non-oxidizing atmosphere are nitrogen, hydrogen, argon, helium and mixtures thereof. Above all, nitrogen gas is suitable for the nitride type and argon or helium gas is suitable for the carbide type. The pressure of the non-oxidizing atmosphere may range from reduced pressure to higher pressure, but nearly normal pressure is preferably used to give good results.

Many efforts to eliminate or suppress the effect of defects on a ceramic surface have hitherto been made by oxidation of the ceramic surface, but it is not easy to control the oxidation state and such a phenomenon has rather been reported that the strength of the ceramics is lowered by defects, e.g. pits existing on the oxidation film. According to the present invention, on the contrary, there can be obtained homogeneous ceramics with not only a higher strength but also a less dispersion thereof without encountering problem in the oxidation film, since the pointed ends of the cracks are blunted, not by oxidation, but by utilizing the mass-transfer in the interior of the ceramics. The mass-transfer in the ceramics used herein means the plastic flow or diffusion of the glass phase in the grain boundary, or the surface or volume diffusion of the crystal grains. When the ceramics are of a silicon nitride type, the mass-transfer of the glass phase in the grain boundary or of crystal grains becomes active at a temperature of 1200° C. or higher, and accordingly, a heat treatment at this temperature results in the components of the ceramics depositing preferentially on the pointed ends of the surface cracks, each having a larger strain, whereby the pointed ends are blunted. In the case of the ceramics of silicon carbide, a temperature of 1400° C. or higher is required for realizing similar effects. The upper limit of the heat treatment temperature should be the sintering temperature, since if temperatures occur which are higher than the sintering temperature, abnormal grain growth occurs, thereby losing the nature of the ceramics. The sintering temperature is about 1650°–1900° C. in the case of ceramics of SiN type and about 1800°–2200° C. in the case of ceramics of SiC type. Therefore, the heat treatment is preferably carried out at a temperature of 1200° to 1700° C. in the former case, and at a temperature of 1400° to 2000° C. in the latter case.

The above described heat treatment is generally carried out for at least 0.5 hour, preferably at least 10 hours.

In a preferred embodiment of the present invention, severe control of the atmosphere for the heat treatment is carried out so as to suppress the formation of new defects with the formation of an oxidation film. The new defects which occur with the formation of the oxidation film are pits or large pores on the surfaces. In this embodiment, the rise of the temperature during the heat treatment is carried out in a vacuum of $1 \times 10^{-3}$ Torr or less in order to suppress the formation of the oxidation film. More preferably, a ceramic sintered compact, subjected to machining, is charged in a carbon case and subjected to heat treatment. The oxygen partial pressure can further be lowered for the benefit of the purpose of this invention by the use of a carbon case.

The heat treatment of the ceramics of a silicon nitride type will, for example, be illustrated: Even in the case of the same heat treatment at 1400° C. for 25 hours, when the heat treatment is carried out by raising the temperature up to 1200° C. in a vacuum of $1 \times 10^{-3}$ Torr and then introducing nitrogen gas at 1200° C. or higher according to the present invention, the oxygen partial pressure at 1400° C. is only lower than $10^{-20}$ atm and the effect of oxygen is negligible, thereby increasing the strength as well as the Weibull modulus, as shown in Table 5 of Example 5, while the heat treatment in the air results in lowering of the strength and Weibull modulus as shown in the Comparative Example. In this case, an oxide layer of 100 µm in thickness is formed on the surface of the ceramic compact, on which surface there are a number of pits. When the heating is carried out in a nitrogen stream from room temperature higher temperatures without the vacuum treatment at the lower temperature range, an oxide layer with a thickness of 7 µm is formed and there are scarcely changes in the strength and Weibull modulus. This oxide layer on the surface of the ceramics is considered to be formed by the reaction with the residual oxygen in a nitrogen gas with a purity of 99.99%.

Since the temperature range where the mass-transfer in the interior of ceramics is active, the vapor pressure of the glass phase in the grain boundary and of the crystal grains is increased, it is not preferable to continue the heat treatment in vacuo from the temperature raising step. In vacuo, the evaporation of the glass phase in the grain boundary and crystal grains is accelerated. Therefore, the heat treatment is carried out in a nitrogen atmosphere at a temperature of 1200° C. or higher in the case of silicon nitride ceramics and in an argon atmosphere at a temperature of 1400° C. or higher in the case of silicon carbide ceramics.

Even in the case of the same heat treatment at 1400° C. for 25 hours, when the heat treatment is carried out by raising the temperature up to 1200° C. in a vacuum of $1 \times 10^{-3}$ Torr and then introducing nitrogen gas at 1200° C. or higher according to the present invention, decomposition or evaporation on the surface of silicon nitride ceramics is substantially negligible, thereby increasing the strength as well as Weibull modulus, as shown in Example 5 of Table 5, while the heat treatment is carried out in a vacuum of $1 \times 10^{-3}$ Torr results in lowering of the strength and Weibull modulus as shown in the Comparative Example. In this case, there is formed a modified surface layer containing a number of pores and needle crystals on the surface of the silicon nitride ceramics. This modified surface layer is considered to be formed by the decomposition or evaporation of the silicon nitride and the glass phase in the grain boundary.

In another preferred embodiment of the present invention, a carbon case to be provided with ceramic samples is used in the heat treatment. When using such a carbon case, the oxygen partial pressure can be so lowered as to be negligible and the oxidation is free from care, even if commercially available nitrogen gas or argon gas with a purity of about 99.99% is used. This carbon case is generally composed of case body 1 to be provided with ceramic workpieces 4 to be heat-treated and carbon cover 2 having small hole 5 for evacuating or introducing a gas, as shown in FIG. 1. Ordinarily, boron nitride powder or sheet 3 is first spread on the bottom surface of case body 1, or the bottom surface is coated with boron nitride and ceramic workpieces 4 are placed thereon so as to prevent ceramic workpieces 4 from direct contact with the bottom surface of case body 1 leading formation of the carbide. In addition, the direct contact can also be prevented by the use of a powder, a sheet-like compact or shaped body of the same composition as ceramic workpieces 4. During the heat treatment, oxygen or moisture contained as an impurity in nitrogen gas or the argon gas reacts with the carbon of the carbon case and is converted to carbon monoxide according to the Boudouard equilibrium, so that the oxygen partial pressure is extremely lowred so as to be negligible. As a method of heating, there can be used high frequency induction heating, resistance heating and infrared heating.

In heat treatments using an oxidizing atmosphere or heat treatments in a nitrogen gas atmosphere free from a treatment for lowering the oxygen partial pressure, a change of strength takes place at a temperature of about of 800° C. as shown in Table 5 of Example 5. This is surely due to the effect of oxidation, since at 800° C., there hardly take place the surface diffusion or volume diffusion of crystal grains and the plastic flow or diffusion of glass phase in grain boundary in the interior of silicon nitride ceramics. In heat treatments in a vacuum of $1 \times 10^{-3}$ Torr, on the other hand, there is no change of strength at about 800° C. as shown in of Example 5 of Table 5 and the effect of the heat treatment appears first within a temperature range of at least 1200° C. wherein the mass-transfer in the interior of silicon nitride ceramics is active.

Furthermore, in heat treatments using an oxidizing atmosphere, or in heat treatments in a nitrogen gas atmosphere free from a treatment for lowering the oxygen partial pressure, the degree of oxidation increase rapidly as the heat treatment temperature approaches the sintering temperature, whereby to lower rapidly the strength and Weibull modulus. On the contrary, the present invention has an advantage that even if the heat treatment is carried out at a temperature near the sintering temperature, there does not occur any lowering of the strength and Weibull modulus and the temperature range and time of the heat treatment can thus be chosen within wider ranges as compared with the method of utilizing oxidation. This advantage leads to choice of the heat treatment conditions within a wider range depending upon the size of cracks when the size of surface cracks or scratches differs with the degree of machining.

The homogenizing effect according to the present invention results from the mass-transfer to the pointed end of a surface crack formed by machining or present intrinsically, thus blunting the pointed end. Therefore, less dispersion and more homogeneous ceramics can be obtained.

The following examples are given in order to illustrate the present invention in greater detail without limiting the same.

EXAMPLE 1

90 wt % $Si_3N$ (manufactured by H. C. Starck Co., LC-12 Grade corresponding to 12 $m^2$/g or BET), 5 wt % $Al_2O_3$ and 5 wt % MgO were ground and mixed for 10 hours in an attriter. 5 wt % of paraffin was added to the resulting powder and pressed in a green compact of $100 \times 100 \times 25$ mm. This compact was subjected to removal of the paraffin at 1000° C. in nitrogen gas, further heated up to 1800° C. at a temperature raising rate of 10° C./min in an atmosphere of 1 atm $N_2$, held for 1 hour and hot-pressed at a pressure of 300 kg/$cm^2$. The thus obtained sintered body or compact was cut and ground by means of a diamond wheel to obtain 60 bending test pieces of 3 mm $\times$ 4 mm $\times$ 40 mm.

The 30 test pieces were then subjected to a heat treatment at 1400° C. in an atmosphere of 1 atm $N_2$ for 1 hour according to the present invention and subjected to a bending test at 800° C. according to JIS 1601 to obtain results concerning the mean bending strength and Weibull modulus with the residual heat treatment-free 30 test pieces for comparison. The results are shown in Table 1:

TABLE 1

|  | Mean Bending Strength (kgf/$mm^2$) | Weibull Modulus |
| --- | --- | --- |
| Present Invention (Test No. 1-1) | 105 | 21 |
| Comparative Example (Test No. 1-2) | 94 | 15 |

EXAMPLE 2

An $Si_3N_4$ compact was prepared and machined to obtain test pieces in an analogous manner to Example 1 but varying the conditions for the heat treatment, thus obtaining results shown in Table 2:

TABLE 2

| Test No. | Temperature (°C.) | Time (hr) | Atmosphere | Gas Pressure (atm) | Mean Bending Strength (kgf/$mm^2$) | Weibull Modulus |
| --- | --- | --- | --- | --- | --- | --- |
| Our Invention | | | | | | |
| 2-1 | 1200 | 1.5 | $N_2$ | 1 | 102 | 19 |
| 2-2 | 1400 | 0.5 | $N_2$ in carbon case | 98 | 20 | |
| 2-3 | 1700 | 1 | 80 vol % $N_2$ + 20 vol % $H_2$ | 2 | 97 | 18 |
| 2-4 | 1400 | 1 | $N_2$ | 10 | 98 | 20 |

TABLE 2-continued

| Test No. | Temperature (°C.) | Time (hr) | Atmosphere | Gas Pressure (atm) | Mean Bending Strength (kgf/mm$^2$) | Weibull Modulus |
| --- | --- | --- | --- | --- | --- | --- |
| 2-5 Comparison | 1400 | 1 | N$_2$ | 100 | 95 | 18 |
| 2-6 | 800 | 3 | N$_2$ | 1 | 97 | 17 |
| 2-7 | 700 | 1 | N$_2$ | 1 | 95 | 15 |
| 2-8 | 1400 | 1 | O$_2$ | 1 | 80 | 15 |

When using a carbon case, BN powder was spread on the bottom of a case body of 300 mm in inner diameter, 100 mm in depth and 8 mm in thickness, and 30 test pieces were placed thereon. The case body was covered with a carbon cover, set in a high frequency furnace for heat treatment and heated while introducing N$_2$ through a small hole made on the carbon cover.

EXAMPLE 3

98 wt % SiC (manufactured by H. C. Starck Co., A-10 Grade), 1 wt % B$_4$C and 1 wt % C were ball milled for 20 hours. 5 wt % of paraffin was added to the resulting mixed powder and pressed in a green compact of 100×100×25 mm by a metal mold. This green compact was subjected to removal of the paraffin at 1000° C. in N$_2$ gas, further heated up to 2050° C. at a temperature raising rate of 20° C./min in an atmosphere of 1 atm Ar, held at 2050° C. for 0.5 hour and hot-pressed at a pressure of 200 kg/cm$^2$.

The thus obtained sintered compact was machined by cutting and grinding using a diamond wheel to obtain 60 test pieces of 3 mm×4 mm×40 mm. The 30 test pieces were then subjected to a heat treatment at 1700° C. in an atmosphere of 1 atm Ar for 1 hour according to the present invention and subjected to a bending test at room temperature according to JIS 1601 to obtain results concerning the mean bending strength and Weibull modulus with the residual heat treatment-free 30 test pieces for comparison. The results are shown in Table 3:

TABLE 3

|  | Mean Bending Strength (kgf/mm$^2$) | Weibull Modulus |
| --- | --- | --- |
| Present Invention (Test No. 3-1) | 75 | 20 |
| Comparative Example (Test No. 3-2) | 70 | 14 |

EXAMPLE 4

90 wt % of Si$_3$N$_4$ (manufactured by H. C. Starck Co., LC-12 Grade), 5 wt % of Al$_2$O$_3$ and 5 wt % of MgO were ground and mixed for 10 hours in an attriter. 5 wt % of paraffin was added to the resulting powder and pressed in a green compact of 100×100×25 mm by a metal mold. This green compact was subjected to removal of the paraffin at 1000° C. in N$_2$ gas, further heated up to 1800° C. at a temperature raising rate of 10° C./min in an atmosphere of 1 atm N$_2$, held at the same temperature for 1 hour, and hot-pressed at a pressure of 300 kg/cm$^2$. The thus obtained sintered compact was cut by a diamond wheel and then subjected to grinding by a diamond wheel of grain size No. 400 to obtain 60 bending test pieces of 3 mm×4 mm×40 mm.

The 30 test pieces were then subjected to a heat treatment by heating up to 1000° C. in a vacuum of 1×10$^{-3}$ Torr, introducing N$_2$ gas at higher than 1000° C. and holding at 1400° C. in 1 atm N$_2$ for 20 hours. These test pieces were subjected to a bending test on three points of 30 mm span to obtain results concerning the mean bending strength and Weibull Modulus with the residual heat treatment-free 30 test pieces for comparison. The results are shown in Table 4:

TABLE 4

|  | Mean Bending Strength (kgf/mm$^2$) | Weibull Modulus |
| --- | --- | --- |
| Present Invention (Test No. 4-1) | 106 | 20 |
| Comparative Example (Test No. 4-2) | 94 | 15 |

EXAMPLE 5

An Si$_3$N$_4$ compact was prepared and machined in an analogous manner to Example 4, thus obtaining test pieces. 30 of these test pieces were placed on BN powder spread on the bottom surface of a carbon case of 300 mm in inner diameter, 100 mm in depth and 8 mm in thickness as shown in FIG. 1, covered with a carbon cover with a small hole, set in a high frequency furnace for heat treatment, heated up to 1200° C. in a vacuum of 1×10$^{-3}$ Torr, after which N$_2$ gas was introduced at 1200° C., and then heat-treated at 1200° C. in 1 atm N$_2$ for 100 hours. The thus treated test pieces were subjected to a bending test on three points of 30 mm span at room temperature to obtain results as to the mean bending strength and Weibull Modulus.

The similar procedures were repeated except varying the heat treatment conditions as shown in Table 5, thus obtaining results as shown in Table 5 with comparative data obtained by changing the carbon case in an alumina case and the temperature for the heat treatment:

TABLE 5

| Test No. | Temp. (°C.) | Time (hr) | Atmosphere for Heat Treatment | Case | Mean Bending Strength (kgf/mm$^2$) | Weibull Modulus |
| --- | --- | --- | --- | --- | --- | --- |
| Our Invention |  |  |  |  |  |  |
| 5-1 | 1200 | 100 | less than 1200° C., 1 × 10$^{-3}$ Torr vacuum; 1200° C., 1 atm N$_2$ | Carbon | 102 | 19 |
| 5-2 | 1400 | 25 | less than 1200° C., 1 × 10$^{-3}$ Torr vacuum; at least 1200° C., 1 atm N$_2$ | " | 105 | 21 |
| 5-3 | 1400 | 25 | less than 1200° C., 1 × 10$^{-3}$ Torr vacuum; at least 1200° C., 10 atm N$_2$ | " | 108 | 20 |
| 5-4 | 1400 | 25 | less than 1200° C., 1 × 10$^{-3}$ Torr | " | 103 | 19 |

TABLE 5-continued

| Test No. | Temp. (°C.) | Time (hr) | Atmosphere for Heat Treatment | Case | Mean Bending Strength (kgf/mm²) | Weibull Modulus |
| --- | --- | --- | --- | --- | --- | --- |
| 5-5 | 1700 | 1 | vacuum; at least 1200° C., 100 atm $N_2$ less than 1200° C., $1 \times 10^{-3}$ Torr vacuum; at least 1200° C., 10 atm $N_2$ | " | 100 | 20 |
| Comparison | | | | | | |
| 5-6 | 800 | 100 | $1 \times 10^{-3}$ Torr vacuum | carbon | 92 | 13 |
| 5-7 | 800 | 100 | 1 atm $N_2$ | alumina | 98 | 14 |
| 5-8 | 800 | 100 | in the air | " | 97 | 15 |
| 5-9 | 1400 | 25 | in the air | " | 51 | 10 |
| 5-10 | 1700 | 1 | in the air | " | 48 | 9 |
| 5-11 | 1400 | 25 | $1 \times 10^{-3}$ Torr vacuum | carbon | 83 | 12 |

EXAMPLE 6

98 wt % of SiC (manufactured by H. C. Starck, A-10 Grade), 1 wt % of $B_4C$ and 1 wt % of C were ball milled for 20 hours. 5 wt % of paraffin was added to the resulting powder and pressed in a green compact of 100×100×25 mm by means of a metal mold press. This green compact was subjected to removal of the paraffin at 1000° C. in $N_2$ gas, further heated up to 2050° C. at a temperature raising rate of 20° C./min in an atmosphere of 1 atm Ar, held at 2050° C. for 0.5 hour and hot-pressed at a pressure of 200 kg/cm².

The thus obtained sintered compact was cut by a diamond grinder and then subjected to grinding by a diamond wheel of grain size No. 400 to obtain 60 bending test pieces of 3 mm×4 mm×40 mm.

The 30 test pieces were then heated up to 1000° C. in a vacuum of $1 \times 10^{-3}$ Torr, after which Ar gas was introduced at higher than 1000° C., and heat-treated at 1700° C. in 1 atm Ar for 10 hours according to the present invention. The thus heat-treated test pieces were subjected to a bending test on three points of 30 mm span at room temperature with the 30 comparative test pieces free from the heat treatment to obtain results as shown in Table 6:

TABLE 6

| | Mean Bending Strength (kgf/mm²) | Weibull Modulus |
| --- | --- | --- |
| Present Invention (Test No. 6-1) | 78 | 20 |
| Comparative Example (Test No. 6-2) | 70 | 14 |

EXAMPLE 7

An SiC compact was prepared and machined to obtain test pieces in an analogous manner to Example 6. 30 of these test pieces were placed on BN powder spread on the bottom surface of a carbon case of 300 mm in inner diameter, 100 mm in depth and 8 mm in thickness as shown in FIG. 1, covered with a carbon cover with a small hole, set in a high frequency furnace for heat treatment, heated up to 1400° C. in a vacuum of $1 \times 10^{-3}$ Torr, after which Ar gas was introduced at 1400° C., and then heat-treated at 1400° C. in atm Ar for 70 hours according to the present invention. The thus heat-treated test pieces were then subjected to a bending test on three points of 30 mm span at room temperature to obtain results concerning the average bending strength and Weibull Modulus.

The similar procedures were repeated except varying the heat treatment conditions as shown in Table 7, thus obtaining results as shown in Table 7 with comparative data obtained by changing the carbon case in an alumina case and the atmosphere for the heat treatment:

TABLE 7

| Test No. | Temp. (°C.) | Time (hr) | Atmosphere for Heat Treatment | Case | Mean Bending strength (kgf/mm²) | Weibull Modulus |
| --- | --- | --- | --- | --- | --- | --- |
| Our Invention | | | | | | |
| 7-1 | 1400 | 70 | less than 1400° C., $1 \times 10^{-3}$ Torr vacuum; 1400° C., 1 atm Ar | Carbon | 77 | 19 |
| 7-2 | 1700 | 20 | less than 1400° C., $1 \times 10^{-3}$ Torr vacuum; at least 1400° C., 1 atm Ar | " | 83 | 20 |
| 7-3 | 1700 | 20 | less than 1400° C., $1 \times 10^{-3}$ Torr vacuum; at least 1400° C., 100 atm Ar | " | 81 | 19 |
| 7-4 | 2000 | 1 | less than 1400° C., $1 \times 10^{-3}$ Torr vacuum; at least 1400° C., 1 atm Ar | " | 76 | 18 |
| Comparison | | | | | | |
| 7-5 | 1000 | 70 | $1 \times 10^{-3}$ Torr | " | 68 | 13 |
| 7-6 | 1000 | 70 | 1 atm Ar | Alumina | 73 | 14 |
| 7-7 | 1000 | 70 | in the air | " | 72 | 12 |
| 7-8 | 1700 | 20 | in the air | " | 73 | 10 |
| 7-9 | 1700 | 20 | $1 \times 10^{-3}$ Torr vacuum | Carbon | 63 | 9 |

What is claimed is:

1. A process for the production of ceramics, which comprises sintering ceramic materials containing silicon nitride as a predominant component, machining the surface of the resulting sintered compact, heating the compact within a carbon case up to a temperature of at least 1000° C. in a vacuum of at most $1 \times 10^{-3}$ Torr and then subjecting the compact within the carbon case to a heat treatment at a temperature of from 1200° C. to the sintering temperature in a nitrogen atmosphere of one atmosphere or more.

2. The process of claim 1, wherein the heat treatment is carried out at a temperature of 1200° to 1700° C.

3. A process according to claim 1 in which the nitrogen atmosphere during the heat treatment is 1 to 100 atmospheres.

* * * * *